Oct. 2, 1956  R. S. KINKEAD  2,764,864
MOWER ELEVATING MEANS
Filed July 30, 1953  2 Sheets-Sheet 2

INVENTOR
ROBERT S. KINKEAD
Caswell & Lagaard
ATTORNEYS

United States Patent Office 2,764,864
Patented Oct. 2, 1956

2,764,864

MOWER ELEVATING MEANS

Robert S. Kinkead, St. Paul, Minn.

Application July 30, 1953, Serial No. 371,223

4 Claims. (Cl. 56—7)

The herein disclosed invention relates to power driven and propelled mowers and particularly to mowers of the reel type in which a number of mower units disposed laterally of one another are employed.

An object of the invention resides in providing a construction whereby the mower units may be moved out of operative extended position and into upright retracted positions when not desired for use whereby the mower may be driven through a gate or other narrow passageway.

Another object of the invention resides in pivoting the mower units at their inner ends and swinging the same upwardly into retracted position.

A still further object of the invention resides in providing a construction whereby the inner ends of the mowers are raised from the ground when in full retracted position thereby preventing injury to the units when travelling over the ground in retracted position.

A feature of the invention resides in using links between the inner ends of the mower and the framework of the mower proper and in pivoting said links to the frames of the mower units and said framework about axes extending in a front to back direction.

Another object of the invention resides in providing arms at the inner ends of the mower units extending forwardly therefrom and in providing pivot means with axes extending in a front to back direction between said arms and framework.

An object of the invention resides in providing stop means between the links and the mower unit frames and in locating the inner pivot means for said links in such position that the mower unit frames and links are caused to travel in unison and the inner ends of the mower units to become raised when the mower units are moved to their final retracted positions.

Another object of the invention resides in providing raising means for simultaneously raising two oppositely disposed mowers.

Other objects of the invention reside in the novel combination and arrangement of parts and in the details of construction hereinafter illustrated and/or described.

In the drawings:

Fig. 6 is a cross sectional fragmentary view taken on line 6—6 of Fig. 1.

Fig. 7 is a longitudinal sectional view taken on line 7—7 of Fig. 1 and drawn to a greater scale.

Figure 1:
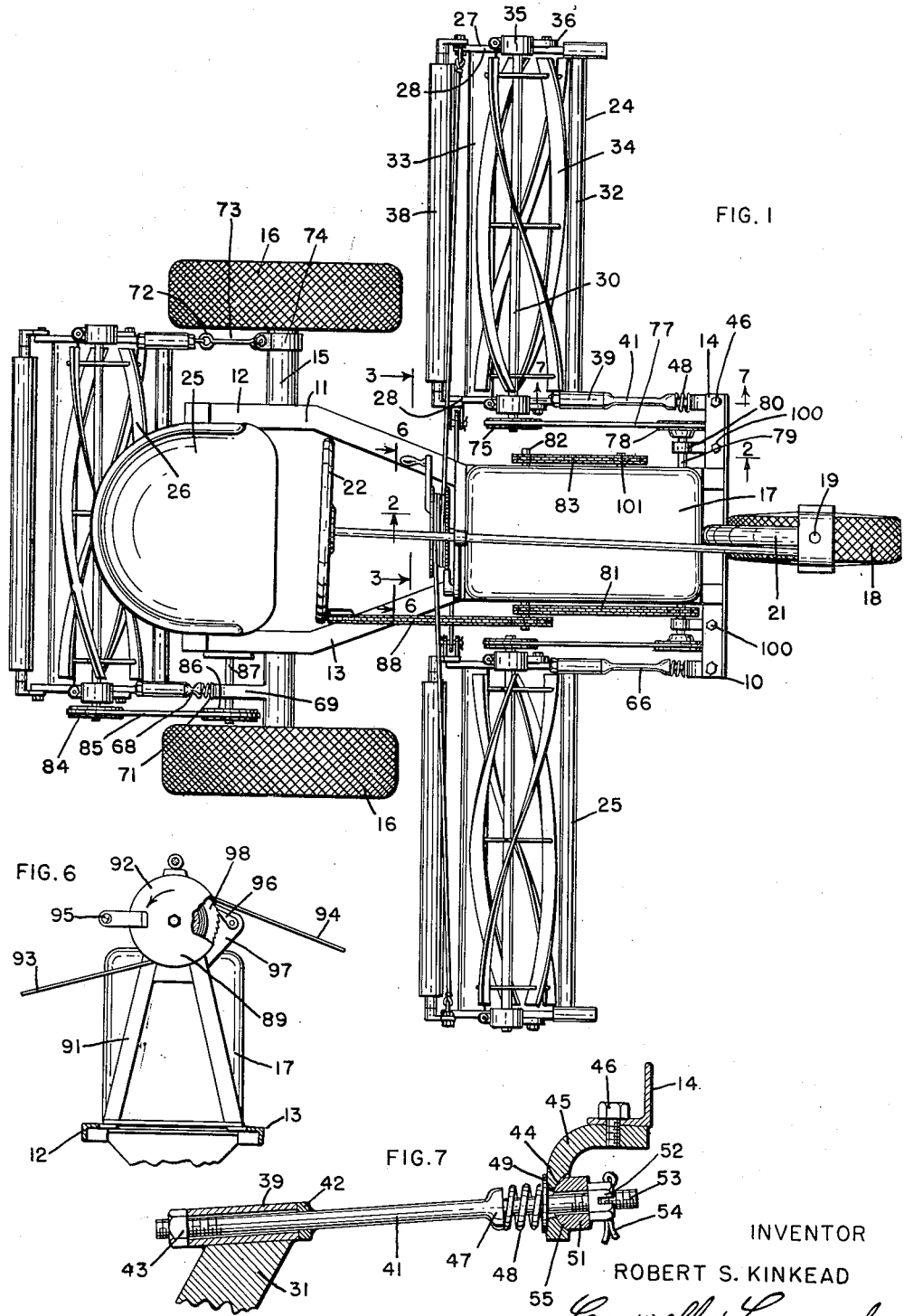
Fig. 1 is a plan view of a mower illustrating an embodiment of the invention applied thereto.
Figure 2:
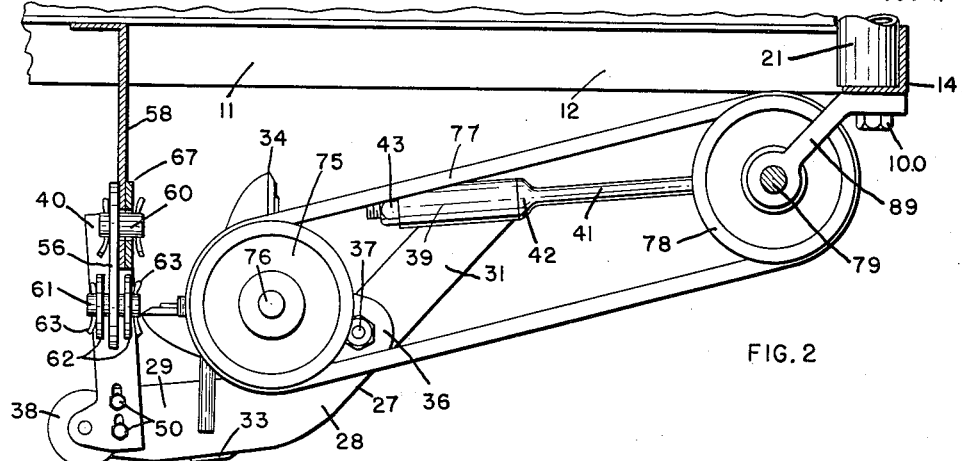
Fig. 2 is a longitudinal sectional view taken on line 2—2 of Fig. 1 and drawn to a greater scale.

In the drawings a mower has been illustrated having a motor driven wheel supported framework. This framework is supported on two rear driving wheels and a front steering wheel. The engine is located forwardly toward the front steering wheels and a driver's seat with the usual controls is disposed at the rear of the framework. The mower includes three reel type mower units, one located to the rear of the driving wheels, and the other two one on each side of the framework and disposed forwardly of the driving wheels. The rear mower unit is connected by means of suitable links to the mower framework whereby the unit may follow irregular ground. The forwardly disposed mower units are connected by means of arms attached to the frames of these units and which extend forwardly thereof and are pivoted to the forward part of the mower framework through universal joints whereby the said units may swing about axes extending in a front to back direction. The rearward ends of the said mower have pivoted to them links which extend inwardly in a transverse direction toward the mower framework and are pivoted to said mower framework and to the mower unit frames by pivot means having axes extending in a front to back direction. By means of this construction the mower units may swing from normal extended positions in which the same travel freely over the ground and to upright retracted positions permitting passage of the mower through a gate or similar constricted passageway. Acting between the links and mower unit frames are stop members which terminate swinging movement of the mower units relative to the links when the mower units reach certain elevated positions and which cause movement of said mower units and links in unison to cause the mower units to swing about the inner pivot means of said links and to become elevated from the ground when the mower units are fully raised.

The purpose of illustrating the invention a vehicle 10 has been shown which comprises a framework 11. This framework includes longitudinal frame members 12 and 13 and a forward transverse frame member 14. At the rear of the framework 11 is disposed an axle housing 15 which supports the framework 11 at the rearward end of the same. This axle housing includes axles not shown and which carry rear driving wheels 16. At the forward portion of the framework 11 is disposed an engine 17 which, together with suitable driving mechanism not illustrated in detail in the drawings, drives the wheels 16. This mechanism is provided with the usual clutch and reducing gearing for properly controlling the speed of the tractor. At the forward portion of the framework 11 is provided a front wheel 18 which is mounted for turning about a vertical pin 19 carried by a bracket 21 secured to the framework 11 at the locality of the transverse frame member 14. Suitable steering mechanism, not shown, is operated by a steering wheel 22 situated toward the rear of the vehicle and in proximity to a driver's seat 23 located at the rear end of the framework 11. The vehicle proper being more or less conventional, has not been shown in detail in the drawings, and it will readily be comprehended that any suitable construction such as is now well known in the art may be used for the purpose.

Supported by the framework 11 of the vehicle 10 are three power units 24, 25 and 26 of the reel type and similarly constructed. The mower unit 24 is located to the left of the framework 11, the mower unit 25 is located to the right of the framework 11, and the mower 26 is located rearwardly of said framework. Mower unit 26 is disposed rearwardly of the driving wheels 16 while the mower units 24 and 25 are located between the driving wheels 16 and the steering wheel 18. The three units are so disposed that the individual swaths cut by the same, overlap, whereby a composite swath may be cut of the full width of the two units 24 and 25. All of the units being of similar construction, only the unit 24 will be described in detail.

The mower unit 24 consists of a frame 27 which comprises two side frame members 28. The side frame members 28 are V-shaped in form and have a substantially horizontal leg 29 and an upwardly inclined leg 31. Attached to the legs 31 of said frame members is a tube 32 which is welded thereto. Attached to the rearward ends of the legs 29 is a bed knife 33 which cooperates with a reel 34 of usual construction. The reel 34 is mounted on a shaft 30. Bearings 35 are secured to brackets 36 and support the shaft 30 and reel 34 for rotation. These brackets are attached to the frame members 28 by means of bolts 37 whereby the reel may be properly adjusted with reference to the bed knife 33. At the rearward ends of the legs 29 are mounted uprights 40 forming part of the frame 27. These uprights are attached to the legs 29 by means of cap screws 50. These uprights pivotally support a roller 38 which engages the ground and determines the height of the remaining stand of grass. While I have shown a mower such as is disclosed in my application for patent, Serial Number 201,452, filed December 18, 1950, now Patent Number 2,671,300, it can readily be comprehended that mower units of various types may be used in place of the mower unit illustrated.

The upper end of the leg 31 of the inner frame member 28 of mower unit 24 has attached to it a tube 39, best shown in Figs. 1 and 7. Extending through this tube is a rod 41 which serves as an arm projecting forwardly from the frame 27 of said mower unit. This rod has a collar 42 attached to it and engaging the forward end of the tube. The rear end of said rod is threaded to receive a nut 43 which engages the rear end of said tube and holds the arm 41 rigidly secured to the mower unit frame 27. The forward end of the arm 41 extends through a spherical socket 44 formed in a bracket 45 secured to the transverse frame member 14 of framework 11 by means of a cap screw 46. The rod 41 is constructed with a collar 47 spaced from the bracket 45. A compression coil spring 48 encircles the rod 41 and engages said collar and a washer 49 also encircling said rod and overlying the end of bracket 45. Mounted on the rod 41 is a sleeve 51 which has a ball shaped end seated in the socket 44. A nut 52 screwed on the threaded end 53 of rod 41 engages the sleeve 51 and urges it into the socket 44 and against the pressure created by the spring 48 thereby maintaining the parts in cooperative relation. A cotter key 54 prevents unloosening of the nut 52. By means of this construction a ball and socket joint, indicated in its entirety by the reference numeral 55, is formed between the end of the arm 41 and the framework 11 at the forward portion of the same, said joint guiding the arm 41 for swinging movement about an axis extending in a front to back direction.

Figures 4, 5:
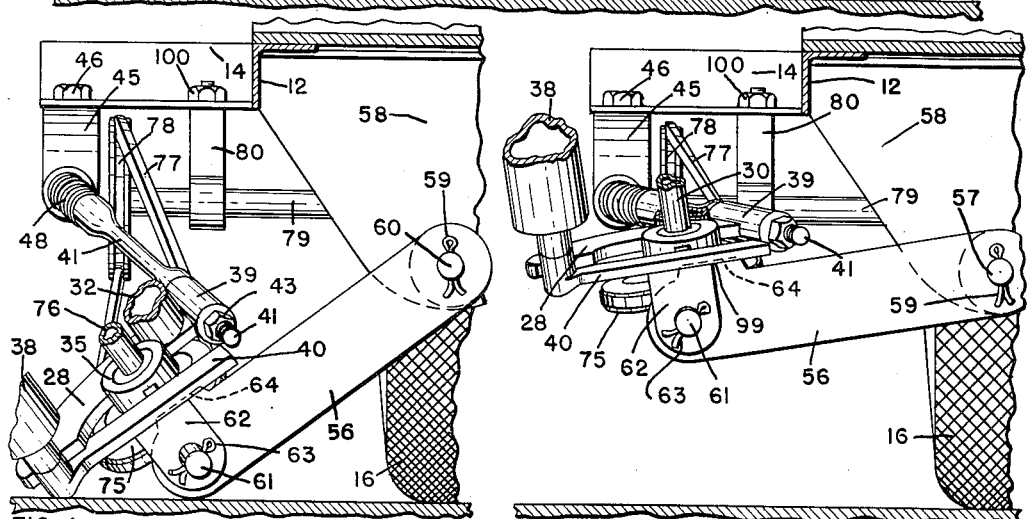
Figs. 4 and 5 are views similar to Fig. 3 and showing the parts in altered position.
Figure 3:
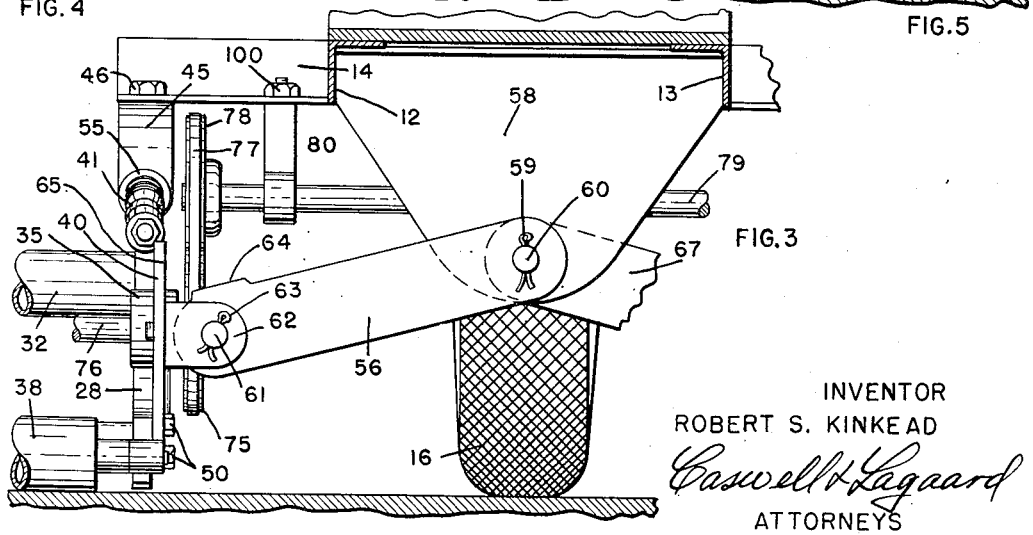
Fig. 3 is a fragmentary cross sectional view taken on line 3—3 of Fig. 1 and drawn to a greater scale.

In addition to the arm 41 for attaching the mower unit 24 to the framework 11, a link 56, best shown in Figs. 3, 4 and 5, is employed. This link is pivoted at its inner end on a pin 60 passing through a bracket 58 secured to the framework 11. Cotter keys 59 extending through said pin hold the said link in position on said pin. The outer end of the link 56 is pivoted on a pin 61 which passes through lugs 62 attached to the inner side upright 40 of the mower unit 24. Cotter keys 63 extending through said pin hold the pin in position. The link 56 is formed with a stop member 64, best shown in Fig. 3, and which is adapted to engage a portion 65 of the upright 40 of frame 27 and which serves as a second stop member cooperating with the stop member 64 to form a stop means 99 terminating the relative swinging between the mower unit and the said link.

The unit 25 is mounted in the same manner as the unit 24 and has an arm 66 pivoted to the transverse frame member 14. The said unit further has a link 67 connected to it in the same manner as the link 56 is connected to the unit 24 and which link is pivoted on the same stud 61 as the link 56.

The unit 26 is connected to the rear axle housing 15 by means of an arm 68 similar to the arm 41. This arm is attached to the frame of said mower unit in the same manner as the arm 41 and is connected to a bracket 69 issuing outwardly from the housing 15. The connection therefor consists of a ball and socket joint indicated at 71 similar to the ball and socket joint 55 on the arm 41. The other end of the unit 26 has attached to it an arm 72 by means of the same construction as the arm 68 which in turn has pivoted to it a link 73. Link 73 in turn is pivoted to a fitting 74 attached to the housing 15. By means of this construction the mower unit 26 is held from transverse motion but free to swing up and down and to follow the contour of the ground over which it travels.

For the purpose of driving the mower unit 24 a sheave 75 is attached to the reel shaft 30 of the reel 34. A belt 77 passes over this sheave and over another sheave 78 fast on a countershaft 79. Shaft 79 is journaled in bearings 80 attached to frame member 14 by means of cap screws 100 and driven through a chain 81 from a countershaft 82 extending below the framework 11 and journaled in suitable bearings carried thereby but not shown in the drawings. Shaft 82 is driven by another countershaft 101 through a chain 83 which in turn is driven by the engine 17. In a similar manner the reel shaft of the unit 26 has attached to it a sheave 84. A belt 85 passes over this sheave and over another sheave 86 mounted on a countershaft 87. This countershaft is journaled in bearings attached to the framework 11 but not illustrated and is driven through a chain 88 which in turn is driven from countershaft 82. It will readily be comprehended that all of the reels are positively driven from the engine and that proper clutches may be installed to provide the necessary controls for controlling the operation of the reels.

Through the action of the arms and the links supporting the mower units said units may be swung upwardly as shown in Fig. 5. For the purpose of raising these units a winch 89 is employed which is mounted on a standard 91 secured to the framework 11. This winch has a drum 92 on which two cables 93 and 94 may be wound. A hand operated crank 95 secured to the drum 92 serves to simultaneously wind up or release the cables 93 and 94. These cables are attached to the upper ends of the uprights 40 at the outer frame members 28 of the frame 27 of the two units 24 and 25 and when the drum is rotated in one direction serve to raise the said units. A dog 96 pivoted to a bracket 97 and attached to the standard 91 engages a ratchet wheel 98 movable with the drum 92 and thus holds the units 24 and 25 in elevated position.

The method of operation of the invention is as follows: In normal operation with the two mower units 24 and 25 lowered, the same travel over the ground as the vehicle 10 is propelled and due to the arms and links connecting the same to the framework 11 follow the contour of the ground. These arms and links restrain lateral or forward and rearward movement yet allow up and down movement and swinging in a vertical direction. The countershaft 79 is located as close to the ball and socket joint 55 as possible. This permits of swinging the unit 24 without placing appreciable strain on the belt 77. The link 56 restrains lateral movement of the unit 24 by permitting the same to swing freely about the pin 61 of the arm 41 and also about the stud 60. Thus the relative positions of the three units is maintained so that a clean swath is cut at all times. When it is desired to drive the mower through a gate or other restricted passageway, the crank 95 is rotated in a counterclockwise direction, as viewed in Fig. 6, and the cables 93 and 94 wound up on the drum 92. This raises the outer ends of the mower units 24 and 25 the units swinging about pins 61 as axes. Upon first raising these units, the inner ends of said units remain in engagement with the ground and upon sufficient swinging the stop members 65 and 64 engage one another. The position of the parts when this occurs is shown in Fig. 4. Further upward movement of the units causes the frame 27 of the unit 24 and the link 56 to swing in unison about the pin 57 as a pivot instead of the pin 61. As the unit is further moved upwardly the same becomes raised to a position such as shown in Fig. 5 in which the same is entirely above the ground and free from engagement with the surface thereof. The dog 96 holds the said units in retracted elevated position. When the units are to be lowered the dog 96 is freed from the ratchet wheel 98 and the units lowered to normal operating position by rotating crank 95 in the opposite direction.

The advantages of the invention are manifest. The arm and link serve as a means of attaching the forward mowers to the vehicle framework without parts extending to the outermost ends of the mower unit frame. At the same time the said arm and link guide the mower for vertical swinging movement to bring the mowers out of the way to permit of the passage of the mower through a gate or other restricted passageway. It becomes unnecessary to remove belts or otherwise make alterations in the driving mechanism for the mowers when the same are to be elevated and the result can be quickly and easily accomplished. The two mower units are raised completely above the ground when in elevated position so that no injury is done to the mowers when the same are out of use and the vehicle travels over the ground.

Changes in the specific form of the invention, as herein described, may be made within the scope of what is claimed without departing from the spirit of the invention.

Having described the invention, what is claimed as new and desired to be protected by Letters Patent is:

1. In a mower, a wheel supported framework, a mower unit having a frame and being disposed to one side of said framework, an arm attached to the frame of said mower unit at the inner portion thereof and extending in a forward direction, pivot means connecting said arm to said framework and guiding said mower unit for swinging movement, a link extending between the inner end of the mower unit frame and the mower framework, outer pivot means connecting said link to said mower unit frame and having an axis extending in a front to back direction, inner pivot means connecting said link to said framework and having an axis extending in a front to back direction, said inner pivot means being disposed inwardly of said mower unit, said mower unit when raised at its outer end initially swinging on said outer pivot means and stop means disposed partly on said link and partly on said mower unit frame and terminating upward swinging movement of said mower unit relative to said link about the outer pivot means of said link and causing upon further raising of the outer end of mower unit simultaneous swinging of said mower unit and link about the inner pivot means of the link, the disposition of said inner pivot means relative to said outer pivot means causing the inner end of the mower unit to rise above the ground when the mower unit and link are moved in unison into the upright retracted position of the mower unit.

2. In a mower, a wheel supported framework, a mower unit having a frame and being disposed to one side of said framework, an arm attached to the frame of said mower unit at the inner portion thereof and extending in a forward direction, pivot means connected to said arm and to said framework and guiding said mower unit for swinging movement, a link extending between the inner end of the mower unit frame and the mower framework, outer pivot means connected to said link and to said mower unit frame and having an axis extending in a front to back direction, inner pivot means connected to said link and to said framework and having an axis extending in a front to back direction, said inner pivot means being disposed inwardly of said mower unit, a stop member on said link, and a stop member on said mower unit frame, said stop members being normally disengaged when the mower unit is in its extended operative position and becoming engaged when the mower unit is partially raised upon swinging movement of the same about the outer pivot means of said link and terminating upward swinging movement of said mower unit relative to said link about the outer pivot means of said link and causing subsequent simultaneous swinging of said mower unit and link about the inner pivot means of the link, the disposition of said inner pivot means relative to said outer pivot means causing the inner end of the mower unit to rise above the ground when the mower unit and link are moved in unison into the upright retracted position of the mower unit.

3. In a mower, a wheel supported framework, a mower unit disposed to one side of said framework, a second mower unit disposed to the other side of said framework and directly opposite said first mower unit, pivot means for said mower units having axes disposed in a front to back direction, said pivot means being connected to said framework forwardly thereof and to said mower units at the inner ends thereof and supporting said units for swinging movement from operative extended positions to upright retracted positions, means pivotally connected to said mower units and to said framework and restraining endwise movement of said mower unit in a lateral direction relative to said framework, rotatable drum means mounted on said framework at a position upwardly of said mower units and having its axis extending in a front to back direction, cables attached to said mower units outwardly of the inner ends thereof and wrapped about said drum means, one of said cables leading off from the drum means at the lower portion of the same and the other leading off from the drum means at the upper portion of the same and means connected to said drum means and serving to rotate the same to procure simultaneous raising of both of the mower units.

4. In a mower, a wheel supported framework, a mower unit having a frame and being disposed to one side of said framework an arm attached to the frame of said mower unit at the inner portion thereof and extending in a forward direction, pivot means connected to said arm and to said framework and guiding said mower unit for swinging movement, a link extending between the inner end of the mower unit frame and the mower framework, outer pivot means connected to said link and to said mower unit frame and having an axis extending in a front to back direction, inner pivot means connected to said link and to said framework and having an axis extending in a front to back direction, said inner pivot means being disposed inwardly of said mower unit, a stop member on said link, and a stop member on said mower unit frame, said stop members being normally disengaged when the mower unit is in its extended operative position and having coacting surfaces engageable when the mower unit is partially raised upon swinging movement about the outer pivot means of said link, said surfaces extending substantially transversely of the direction of movement of said stop member of the mower unit at the instant of engagement with the stop member on the link, said stop members terminating upward swinging movement of said mower unit relative to said link about the outer pivot means of said link and causing subsequent simultaneous swinging of said mower unit and link about the inner pivot means of the link, the disposition of said inner pivot means relative to said outer pivot means causing the inner end of the mower unit to rise above the ground when the mower unit and link are moved in unison into the upright retracted position of the mower unit.

References Cited in the file of this patent

UNITED STATES PATENTS

| | | |
|---|---|---|
| 1,944,584 | Stegeman | Jan. 23, 1934 |
| 2,104,719 | Pol et al. | Jan. 4, 1938 |
| 2,145,467 | Waddell | Jan. 31, 1939 |
| 2,191,135 | Roth | Feb. 20, 1940 |
| 2,283,269 | Krenzke | May 19, 1942 |
| 2,299,859 | Speiser | Oct. 27, 1942 |